May 22, 1962 J. P. STEEPE 3,035,653
MEANS FOR TANDEM OPERATION OF POWERED VEHICLES
Filed Feb. 2, 1960
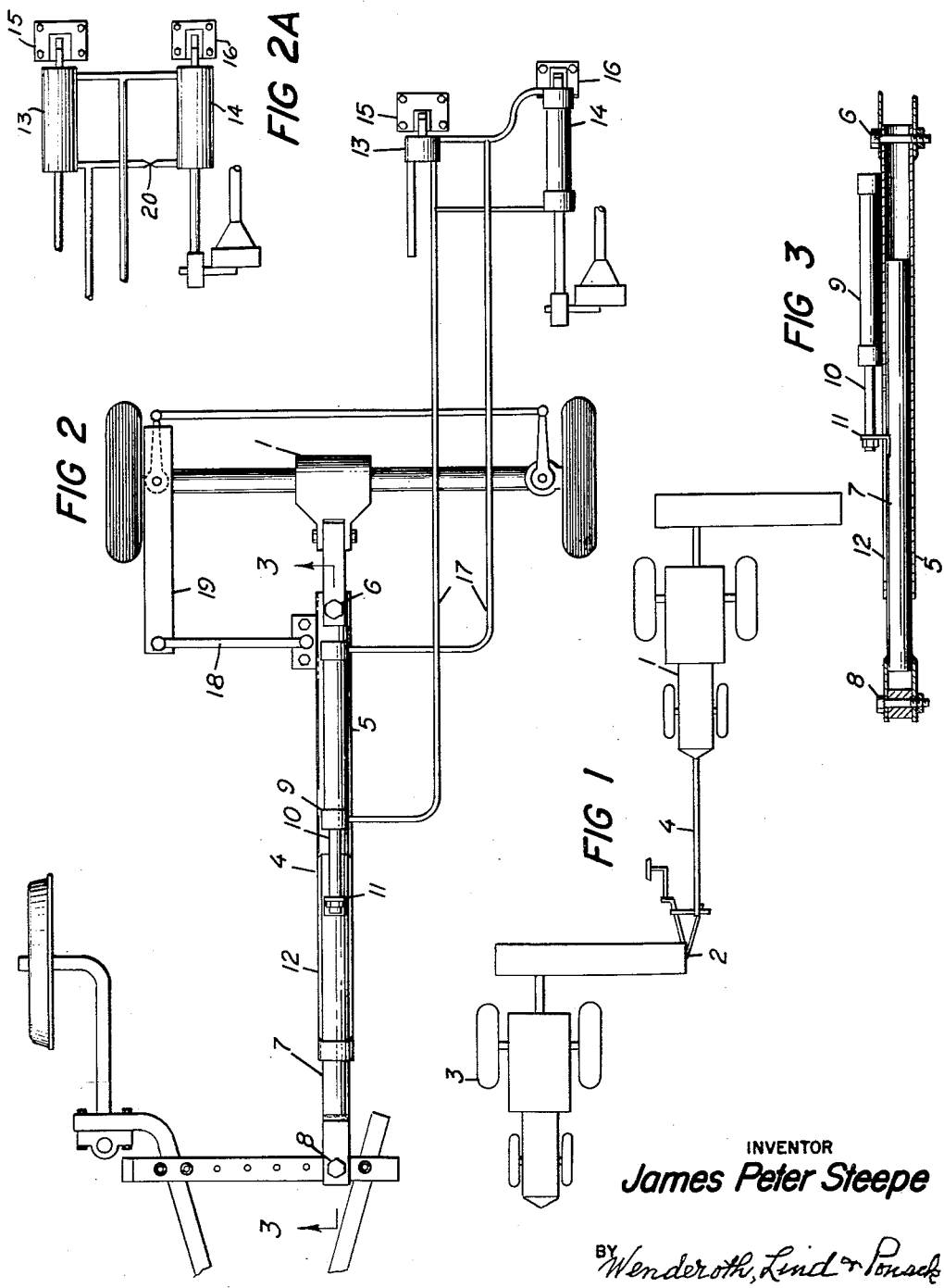
INVENTOR
James Peter Steepe
BY Wenderoth, Lind & Ponack
ATTORNEYS

United States Patent Office 3,035,653
Patented May 22, 1962

3,035,653
MEANS FOR TANDEM OPERATION OF POWERED VEHICLES
James Peter Steepe, Ky Valley, Victoria, Australia
Filed Feb. 2, 1960, Ser. No. 6,180
5 Claims. (Cl. 180—14)

This invention relates to means for permitting the tandem operation of vehicles, each of which is provided with a power unit for traction purposes.

Known systems for the tandem operation of powered vehicles utilize a control system for the simultaneous operation of throttle and clutch controls etc., together with a coupling which is capable of taking heavy traction forces. In these known arrangement a heavy coupling is essential because heavy loads may be imposed on the coupling through variations in the acceleration rate and traction resistance of each vehicle. An electric, pneumatic or other interconnecting means must be built into the vehicles concerned and this restricts the interchangeability of vehicles with different types of power units or different control systems.

One object of this invention is to provide means for the tandem operation of powered vehicles which does not require special preparation or construction of both vehicles concerned.

Another object of the invention is the provision of means by which a trailing vehicle may be operated in tandem with a leading vehicle and the power unit of the trailing vehicle controlled to best advantage without the provision of special control apparatus on the leading vehicle.

In accordance with the invention, there is provided apparatus for tandem operation of two powered vehicles comprising an extensible draw bar having two parts capable of relative movement and means connected to the draw bar and operable in response to relative movement of the two parts of the draw bar to control the position of the principal engine controls of one of the vehicles. In the case of conventional vehicles powered by internal combustion engines the principal controls would be the throttle and clutch controls.

Preferably, there is provided a double acting hydraulic cylinder mechanism the cylinder of which is attached to one part of the draw bar and the piston of which is attached to the other part of the draw bar so that the said mechanism is actuated by extension of the draw bar, and at least one further double acting hydraulic cylinder fitted to the principal engine controls so that relative movement of the piston and cylinder attached to the draw bar moves the piston fitted to the other cylinder and thereby varies the position of the principal engine controls. In the case where the trailing vehicle is powered by an internal combustion engine having clutch and throttle controls, there is provided two of the said further double acting hydraulic cylinders connected respectively to actuate the clutch and the throttle controls. The clutch actuating cylinder is of smaller diameter than the throttle actuating cylinder or has the inlet of hydraulic fluid to it restricted so that the throttle actuating cylinder is operated preferentially when the draw bar extension is changed.

In service, the more rapid operation of the throttle control combines with the free travel which is normally provided in a clutch control to ensure that the throttle is opened to speed up the engine before the clutch is let out, and to throttle back the engine before the clutch is let in.

One embodiment of the invention as adapted to the tandem operation of agricultural tractors tractors will now be described with reference to the accompanying drawings of which:

FIGURE 1 is a schematic plan view of two tractors and associated implements arranged for operation in tandem, FIGURE 2 is a schematic plan view of means in accordance with the invention for the tandem operation of tractors and like vehicles, FIG. 2A is an alternative arrangement of a portion of FIG. 2, and FIGURE 3 is a section along the line 3—3 of FIGURE 2.

As shown in FIGURE 1, a trailing tractor 1 is connected to the rear of an implement 2 drawn by a leading tractor 3 by means of an extensible draw bar 4. As illustrated in FIGURE 2, the draw bar 4 comprises an outer casing 5 connected by a pin joint 6 to the trailing tractor 1 and an inner tubular member 7 which is free to reciprocate in the outer member 5 and is connected to the leading implement 2 by a further pin joint 8. A double acting hydraulic cylinder 9 is rigidly attached to the outer casing 5 and the piston rod 10 of the hydraulic cylinder 9 is attached to the inner member 7, the connection 11 from the piston rod to the inner member passing through a slot 12 in the outer casing and also serving to limit the relative reciprocating movements between the inner and outer members. Double acting hydraulic cylinders 13 and 14 are attached to the throttle linkage 15 and the clutch pedal 16 respectively of the trailing tractor 1 and are connected hydraulically in parallel with the draw bar cylinder 9 by suitable flexible tubing 17 so that any movement of the draw bar cylinder 9 is immediately communicated to the clutch cylinder 14 and throttle cylinder 13. The throttle cylinder 13 is made of larger diameter than the clutch cylinder 14 so that a greater hydraulic force is applied to it, and it therefore imparts a more rapid movement. If adjustment is required to vary the relationship between the movement of the clutch cylinder 14 and the throttle cylinder 13, a choke 20, as shown in FIG. 2A, or control valves may be fitted to restrict the flow of hydraulic fluid through the inlets to the clutch cylinder 14.

To permit steering of the trailing tractor 1, a link 18 is provided to connect the outer member 5 of the draw bar 4 to the steering arm 19 of the trailing tractor 1 so that sideways movement of the draw bar 4 causes the wheels of the trailing tractor 1 to turn in the appropriate direction.

In operation, the driver drives the leading tractor in the normal manner. Forward movement of the leading tractor causes extension of the draw bar which in turn causes the throttle of the trailing tractor to be opened and the clutch pedal to be released.

The difference in diameter between the throttle cylinder and the clutch cylinder causes the throttle to be depressed for a major part of its travel before the free movement of the clutch pedal has been overcome and engagement of the clutch begins. When the clutch has been fully released and both vehicles are under way, the small diameter of the clutch cylinder combines with the free travel of the clutch effectively to damp out further actuation of the clutch by the master cylinder 9 under small extensions of the draw bar so that the cylinder then serves merely to control the throttle opening under normal operating conditions.

The throttle opening is increased when the trailing tractor lags behind and is reduced when the trailing tractor tends to over-run the leading tractor so that the trailing tractor follows at a constant interval and the only loading imposed on the draw bar is the very small force required to actuate the throttle of the trailing tractor. On stopping, the throttle of the trailing tractor is automatically closed off and the clutch is released so that its engine is not stalled.

A similar control system may be applied to other vehicles such as motor cars and trucks when two or more are required to be operated in tandem by one driver.

In these circumstances, equipment in accordance with the invention is of great practical virtue in that it may be made as a portable, self-contained unit which may be readily fitted to any vehicle without structural alteration of the vehicle. It is merely necessary to connect the draw bar to the front of a vehicle, connect the steering link to the steering tie-rod of the vehicle and to clamp the clutch and throttle control cylinders in position. When the engine has been started and the gear lever engaged, the vehicle to which the controls have been fitted may be readily towed behind any other vehicle. Similar apparatus may be used to operate other types of powered vehicles such as those used on railways, and this eliminates the necessity for the provision of elaborate multiple unit control systems and their attendant operating disadvantages which include the need for wiring of the vehicles concerned with multiple unit control system cables and the limitation to vehicles which are provided with identical multiple unit control systems.

It will be understood therefore that the form and application of apparatus according to this invention is not limited to the particular examples given herein and that other variations and adaptations may be made without departing from the spirit and scope of the invention.

I claim:

1. Apparatus for tandem operation of a pair of powered vehicles, one of which is a trailing vehicle and is powered by an internal combustion engine having clutch and throttle controls, comprising an extensible draw-bar having two parts capable of relative movement with respect to each other, a first double acting hydraulic cylinder mechanism the cylinder of which is attached to one part of the draw-bar and the piston of which is attached to the other part of the draw-bar, whereby relative movement of the parts of the draw-bar causes relative movement of the said piston and the said cylinder, and two further double acting hydraulic cylinder mechanisms connected hydraulically with the first said hydraulic cylinder mechanism and connected respectively to actuate the clutch and throttle controls of the trailing vehicle so that relative movement of the piston and cylinder of the first said hydraulic cylinder mechanism causes relative movement of the pistons and cylinders of the two further double acting hydraulic cylinder mechanisms and thereby varies the position of the clutch and throttle controls of the trailing vehicle.

2. Apparatus as claimed in claim 1, in which the cylinder on the further hydraulic cylinder mechanism connected to actuate the clutch control of the trailing vehicle is of smaller diameter than the cylinder of the further hydraulic cylinder mechanism connected to actuate the throttle control of the said vehicle, so that the said throttle control is actuated preferentially when relative movement occurs between the two parts of the draw-bar.

3. Apparataus as claimed in claim 1, in which the cylinder of the further double acting cylinder mechanism connected to actuate the clutch control of the trailing vehicle has the inlet for hydraulic fluid to it restricted so that the throttle control is actuated preferentially when relative movement occurs between the two parts of the draw-bar.

4. Apparatus for tandem operation of two powered vehicles one of which is a trailing vehicle and which is powered by an internal combustion engine having clutch and throttle controls, comprising an extensible draw-bar having an outer member and an inner member capable of relative movement with respect of each other, a first double acting hydraulic cylinder mechanism the cylinder of which is attached to the outer member of the draw-bar, said outer member having a longitudinally extending slot therein, a connection passing through said slot and connecting the piston of said first hydraulic cylinder mechanism to the inner member of the draw-bar so that relative movement of said outer member and said inner member causes relative movement between said cylinder and said piston, said connection also serving to limit the relative movement between said outer member and said inner member, and two further double acting hydraulic cylinder mechanisms hydraulically connected to the first said hydraulic cylinder mechanism and fitted to actuate the clutch and throttle controls of the trailing vehicle so that relative movement of the pistons and cylinder of the said first double acting hydraulic cylinder mechanism causes relative movement between the pistons and cylinders of the further double acting hydraulic cylinder mechanisms attached to the clutch and throttle controls of the trailing vehicle and thereby varies the position of the said clutch and throttle controls.

5. Apparatus as claimed in claim 4, in which the cylinder on the further hydraulic cylinder mechanism connected to actuate the clutch control of the trailing vehicle is of smaller diameter than the cylinder of the further hydraulic cylinder mechanism connected to actuate the throttel control of the said vehicle, so that the said throttle control is actuated preferentially when relative movement occurs between the two parts of the draw-bar.

References Cited in the file of this patent

UNITED STATES PATENTS

| 1,302,686 | Lock | May 6, 1919 |
| 2,922,481 | Hutter et al. | Jan. 26, 1960 |

FOREIGN PATENTS

| 581,194 | France | Sept. 22, 1924 |